Patented Aug. 16, 1938

2,127,375

UNITED STATES PATENT OFFICE 2,127,375

ESTERS OF DITHIOCARBAMIC ACIDS

Euclid W. Bousquet, Wilmington, Del., assignor to E. I. du Pont de Nemours & Company, Wilmington, Del., a corporation of Delaware No Drawing. Application July 17, 1935, Serial No. 31,862

4 Claims. (Cl. 260—455)

This invention relates to new compositions of matter, more specifically to high molecular weight polysulfur compounds, and still more specifically to aliphatic ester derivatives of dithiocarbamic acid containing at least one long-chain alkyl radical.

The lower aliphatic xanthates and dithiocarbamates, their esters and anhydrides have been prepared and these have been proposed for insecticides, flotation agents and rubber accelerators but have the disadvantage of undesirable odor, high volatility and poor stability in water. Further, the long-chain sodium alkyl xanthates have been prepared and have been proposed for these applications but they are soluble in water, react with the lime in hard water and are unsuited for many uses.

The object of this invention is to prepare high molecular weight water-insoluble derivatives of dithiocarbamic acid. A further object is to prepare such compounds suitable for use as insecticides, flotation agents and rubber accelerators. A still further object is the preparation of aliphatic esters and derivatives of dithiocarbamic acid containing at least one long aliphatic chain radical of eight or more carbons atoms.

These objects are accomplished by the following invention:

Water-insoluble derivatives of carbon bisulfide are prepared by the introduction of long aliphatic chains. Particularly suitable are those compounds made from octyl and higher alcohols, especially those from the catalytic hydrogenation of coconut oil, palm kernel oil, or the oil acids. Chemically speaking, all of these derivatives may be classed as esters of sulfothiocarbonic acid, HOCSSH. Since the latter is a dibasic acid we can have diesters such as ROCSSR, where "R" is a straight-chain aliphatic hydrocarbon radical, and amide esters characterized by the formula RNZCSSR, in which "R" is a straight chain aliphatic hydrocarbon radical and "Z" is hydrogen or an aliphatic hydrocarbon radical. The amide esters of sulfothiocarbonic acid are also known as esters of the dithiocarbamic acids. The esters of dithiocarbamic acid coming within the scope of this invention have the following common physical properties; namely, high boiling and low melting points, low odor, organic solvent solubility, water insolubility, and having formulas in which the grouping

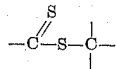

occurs at least once. The methods for their preparation involve reaction of carbon bisulfide on an amine followed by condensation of the resulting intermediate with a halogen compound. The long chain can be present either in the amine or the halogen compound.

Esters of alkyl dithiocarbamic acids may be made by: Heating a salt of an alkyl dithiocarbamic acid with an alkyl halide; for example, the sodium salt of dimethyl dithiocarbamic acid when heated with cetyl bromide yields the cetyl ester of dimethyl dithiocarbamic acid.

This invention will be more readily understood by reference to the following examples but it is not intended that these examples should limit the scope of the invention.

*Example I*

Dodecyl ester of diethyl dithiocarbamic acid was prepared by the following process. The sodium salt of diethyl dithiocarbamic acid was prepared by mixing a solution of 7.3 parts by weight of diethylamine, 23 parts by weight of carbon bisulfide in 50 cc. of ethyl alcohol with a solution of 4 parts by weight of sodium hydroxide in 75 cc. of absolute ethyl alcohol and allowed to stand about 48 hours. The solution was evaporated to dryness on the steam bath, and the fine white crystalline precipitate washed with ether. Eight and five-tenths parts by weight of the sodium salt and 12.5 parts by weight of dodecyl bromide were refluxed in 80 cc. of absolute alcohols for 15 hours. The solvent was evaporated and the product dissolved in ether, washed with water, and the ether solution dried with sodium sulfate. After filtering, the ether was evaporated and the product distilled, collecting the fraction which boiled at 212° to 214° C. at 4 mm. The oil analyzed 64.77% carbon, 11.16% hydrogen, calculated 64.35% carbon, 11.04% hydrogen. The colorless oil was insoluble in water, but soluble in alcohol, benzene, kerosene and ether.

*Example II*

Octyl diethyldithiocarbamate was prepared by the following process. Seventeen and four-tenths parts by weight of the sodium salt of diethyldithiocarbamate and 19.3 parts by weight of octyl bromide were dissolved in 100 cc. of absolute ethyl alcohol and refluxed 3 hours. The alcohol was evaporated, the product washed with water, dissolved in ether, dried over sodium sulfate and the ether evaporated. On distillation, a fraction was isolated which boiled at 165° to 167° C. at 4 mm. pressure and analyzed 24.3% sulfur, calculated 24.5%. The pale yellow oil was insoluble in water, but soluble in alcohol, ether, gasoline and benzene.

This invention covers the formation of compounds of the following type:

Compounds of the formula $R_1R_2NCSSR$, in which at least one of the radicals R, $R_1$, $R_2$ is a straight-chain aliphatic hydrocarbon radical of at least eight carbon atoms, R and $R_2$ are aliphatic hydrocarbon radicals, $R_1$ is hydrogen or R. Such compounds include dodecyl diethyl dithiocarbamate, $(C_2H_5)_2NCSSC_{12}H_{25}$; methyl dodecyl dithiocarbamate, $C_{12}H_{25}NHCSSCH_3$; eicosyl dimethyl dithiocarbamate, $(CH_3)_2NCSSC_{20}H_{41}$; dodecyl dilauryl dithiocarbamate, $(C_{12}H_{25})_2NHCSSC_{12}H_{25}$;

octyl diethyl dithiocarbamate, $(C_2H_5)_2NCSSC_8H_{17}$;

etc.

In place of the dodecyl bromide used in the above examples, I may use the chlorides of the mixture of alcohols obtained by the carboxylic hydrogenation of coconut oil.

The following examples show some of the uses of the various compounds disclosed above:

Example III

Dodecyl diethyl dithiocarbamate may be used as a dispersing agent for carbon black in rubber, as a rubber accelerator, as a flotation reagent, as a pharmaceutical, and as an acid inhibitor.

Example IV

Dodecyl diethyl dithiocarbamate may be used in the following manner as a parasiticide. An emulsion of 0.1% dodecyl diethyl dithiocarbamate with 0.2% sulfonated fish oil gave 80% to 90% kill of chrysanthemum aphids while a similar emulsion, but containing no dodecyl diethyl dithiocarbamate, gave a kill of 7.7%.

As many apparently widely different embodiments of this invention may be made without departing from the spirit and scope thereof, it is to be understood that I do not limit myself to the specific embodiments thereof except as defined in the appended patent claims.

I claim:

1. An ester of a dithiocarbamic acid, said ester including at least two alkyl radicals at least one of which is a straight-chain radical of at least eight carbon atoms.

2. An ester in accordance with claim 1 characterized in that it is an alkyl ester of a dithiocarbamic acid in which at least one of the alkyl radicals is that of an alcohol obtainable by the carboxyl hydrogenation of coconut oil.

3. An ester in accordance with claim 1 characterized in that it is an alkyl ester of an alkyl dithiocarbamic acid, the alkyl group in said alkyl dithiocarbamic acid being that of an alcohol obtainable by carboxyl hydrogenation of coconut oil.

4. Dodecyl N-diethyl dithiocarbamate.

EUCLID W. BOUSQUET.